J. T. DILLON.
AUTOMOBILE JACK.
APPLICATION FILED APR. 3, 1912.
1,076,555. Patented Oct. 21, 1913.
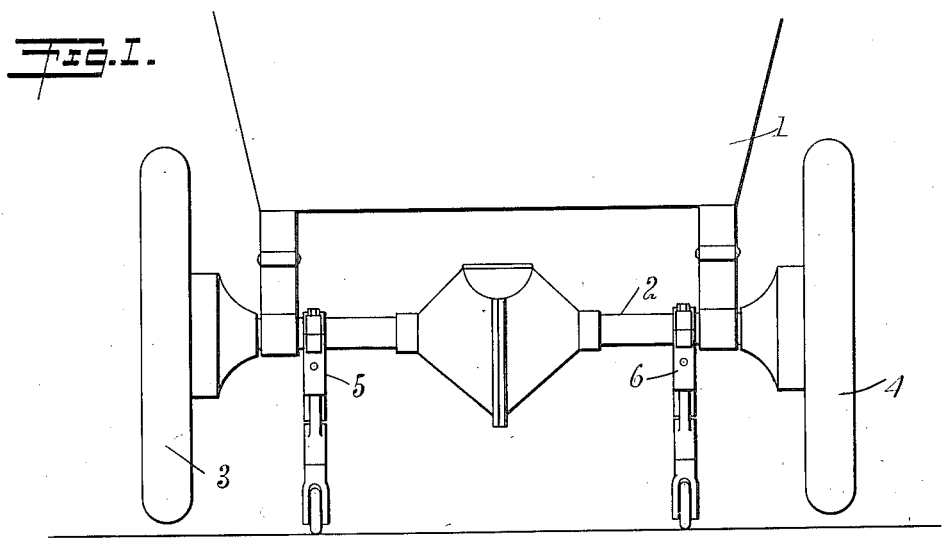
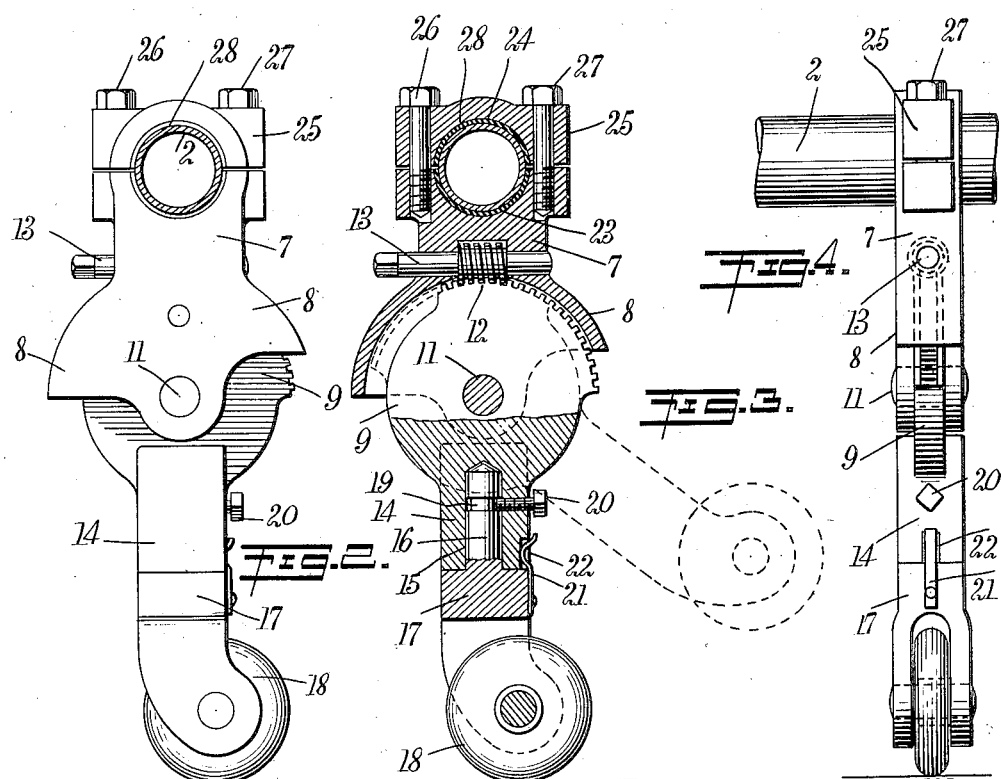
WITNESSES
G. Robert Thomas
A. L. Kitchin
INVENTOR
James T. Dillon
BY Mmm & Co
ATTORNEYS

UNITED STATES PATENT OFFICE.

JAMES T. DILLON, OF GREENWICH, CONNECTICUT.

AUTOMOBILE-JACK.

1,076,555.  Specification of Letters Patent.  Patented Oct. 21, 1913.

Application filed April 3, 1912. Serial No. 688,345.

*To all whom it may concern:*

Be it known that I, JAMES T. DILLON, a citizen of the United States, and a resident of Greenwich, in the county of Fairfield and State of Connecticut, have invented a new and Improved Automobile-Jack, of which the following is a full, clear, and exact description.

This invention relates to improvements in supporting devices for automobiles and the like, and particularly to an improved jack structure.

The object in view is to provide an improved construction and arrangement adapted to be secured to the axles of an automobile or other vehicle for acting in a plurality of capacities, as for instance a jack, an emergency wheel, and a turntable.

A further object of the invention is the provision of a swinging arm containing a pivotally mounted wheel, associated with means for clamping the arm to the axle of an automobile or other vehicle, and formed with an operating structure for raising and lowering the arm.

A still further object of the invention is the provision of a clasping member for supporting the device in position, formed with a guiding head and provided with a driving worm, these structures being associated with a worm wheel structure pivotally mounted in a guiding head and meshing with the worm in the head structure so as to move pivotally the worm gear, the worm gear in turn being associated with a caster which is adapted to be moved to an operative position and an inoperative position by the movement of the worm and the worm gear.

In carrying out the objects of the invention, a structure is provided which when used with an automobile is connected to the axle thereof near each wheel so that there will be a pair of supporting jack structures in the front and in the rear of the machine. These jack structures are provided with a pivotally secured lug or arm adapted to be moved from one position to the other by a worm and gear. This structure permits each of the devices to be operated independently and to act in various capacities, namely, as a jack, a turntable for an automobile, and an emergency wheel.

A practical embodiment of the invention is represented in the accompanying drawings forming a part of this specification, in which similar characters of reference indicate corresponding parts in all the views.

Figure 1 is a fragmentary rear elevation of an automobile with a pair of devices embodying the invention connected therewith; Fig. 2 is a side view of an embodiment of the invention, a shaft or axle being shown therewith; Fig. 3 is a longitudinal vertical section through the structure shown in Fig. 2; and Fig. 4 is an edge view of the structure shown in Fig. 2.

Referring to the accompanying drawings by numerals, 1 indicates the body of an automobile provided in the usual manner with an axle housing 2. Arranged at each end of the axle housing 2 are wheels 3 and 4. Connected rigidly to the housing 2 are jacks 5 and 6 embodying the invention. It will be evident that one or more of these jacks could be secured to the front axle as well as to the rear axle housing, so that the same may act either as a jack for raising any particular point, or may act as a supporting truck or turntable. Preferably there are four devices used, one at each end of each of the axle housings. This permits any desired point to be elevated and also permits any of the devices to be used as a jack or as an emergency wheel in case one of the usual wheels of the automobile becomes broken. When desired, all of the jacks could be used simultaneously as a truck or turntable for the automobile. This use is of considerable advantage in storage places and repair places.

In constructing the jacks the same are provided with a body portion 7 formed with an inclosing guiding apron 8 in which is positioned a worm gear 9 held pivotally by a pivotal pin 10. The worm gear 9 is designed to mesh with a worm 12 held in place by a shaft 13 provided with a suitable squared end for receiving a tool which when used will cause the gear 9 to be rotated one way or the other according to the rotation of the shaft 13. Rigidly secured to the gear wheel or formed integral therewith, is a depending arm 14 formed with a socket 15. The socket 15 is designed to accommodate a projection 16 from a caster 17 which is provided with a wheel 18. The wheel 18 may be of any desired structure, preferably of a strong metallic structure having a rubber tire arranged thereon. In order to prevent the caster 17 from becoming disconnected from the arm 14, the extension 16 is provided with a groove 19 into which a retaining set screw 20 is passed. The set screw 20 prevents a longitudinal movement of the extension 16, but permits a free pivotal movement thereof. In order to prevent the caster 17 from swinging when the arm 14 is raised to a horizontal position or to substantially that position, a spring catch 21 is provided which is rigidly secured to the caster 17 and is adapted to snap into the notch 22 provided in the arm 14. This is of advantage when the devices are used on an automobile and are moved in an operative position while the automobile is being used in the usual manner, as it will prevent the swinging of the caster.

The body portion 7 is formed with a groove 23 which co-acts with a groove 24 in a clamping plate 25 for clamping the axle housing 2 when the device is in use. A pair of clamping bolts 26 and 27 are used for properly holding the plate 25 in position.

In order to more easily hold the device in position on the axle housing 2, a rubber gasket or filling sleeve 28 is inserted between the body portion 7 and the plate 25 for affording a gripping member.

Having thus described my invention I claim as new and desire to secure by Letters Patent:—

1. In a device of the character described, a body portion formed with an article-engaging portion, a clamping means for clamping said body portion in position, a substantially disk-shaped member pivotally mounted on said body portion, said disk-shaped member being formed with a rack on one edge and a radiating leg on substantially the opposite edge, a caster pivotally mounted on said leg, and a worm mounted in said body portion engaging said rack for swinging said caster from one position to another.

2. In a device of the character described, the combination with a vehicle of a body portion, means for clamping said body portion to the axle of said vehicle, a swinging member mounted on said body portion, means for swinging said member to a vertical position whereby said axle is raised and supported, a caster mounted on said swinging member, and a spring secured to said caster and frictionally engaging said swinging member for preventing rotation of the caster when the same is out of contact with the earth.

3. The combination with a vehicle formed with a pair of axles, of a jack adapted to be secured to each end of each of said axles for supporting said vehicle, each of said jacks comprising a body portion, means for rigidly clamping said body portion in position, a swinging member connected with said body portion, said swinging member being formed with a rack on one side, a worm mounted on said body portion engaging said rack for swinging said swinging member, and a caster construction mounted on said swinging member, said caster construction including a traction wheel whereby when said jacks are lowered and said vehicle is elevated said vehicle may be turned around within its own length.

4. In a device of the character described, a body portion, means for clamping said body portion to an article to be supported, a depending apron extending from said body portion and defining a socket, a worm gear arranged in said socket and guided thereby, means for pivotally mounting said worm gear in said socket, a manually operated worm meshing with said worm gear for moving the worm gear, a depending arm extending from said worm gear, and a caster connected to said arm.

In testimony whereof I have signed my name to this specification in the presence of two subscribing witnesses.

JAMES T. DILLON.

Witnesses:
JAS. F. WALSH,
MARJORY K. HURLEY.